April 16, 1935.                E. E. ARNOLD                1,997,671
                                 PROPELLER
                              Filed Oct. 30, 1930
Fig. 1.
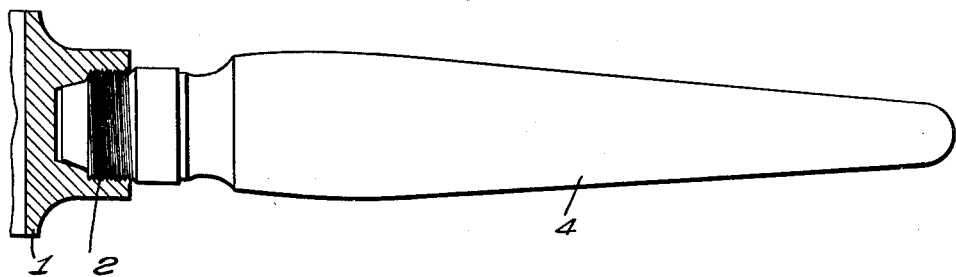
Fig. 2.
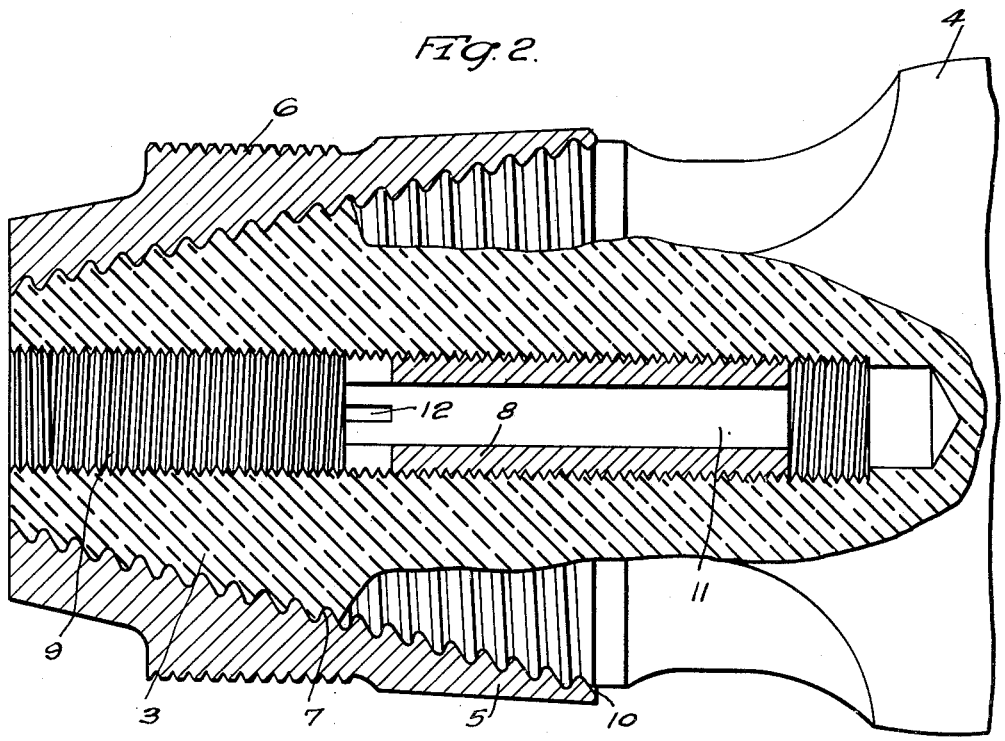
Fig. 3.       Fig. 4.
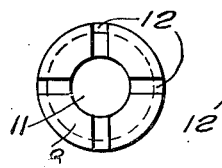   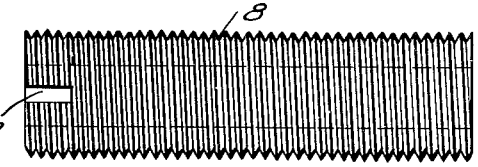
INVENTOR
Edwin E. Arnold.
BY
Wesley G. Carr
ATTORNEY Patented Apr. 16, 1935

1,997,671

UNITED STATES PATENT OFFICE 1,997,671

PROPELLER

Edwin E. Arnold, Pittsburgh, Pa., assignor to Westinghouse Electric & Manufacturing Company, a corporation of Pennsylvania Application October 30, 1930, Serial No. 492,213

10 Claims. (Cl. 170—177)

The invention relates to airplane propellers and particularly to a means for obtaining static and dynamic balance in such devices.

In propellers having a plurality of blades fastened to a hub, it is important to have each blade balanced as to weight and as to the center of gravity of similarly located opposite blades, so that the blades will be dynamically balanced. Because of the process of manufacture of many blades, the masses are not distributed evenly along their axes and, therefore, their centers of gravity differ. The stresses on the hub, therefore, as well as the beam reactions, vary and soon tear the propeller to pieces. The dynamic balance is quite as important as the weight or static balance.

Heretofore, balancing has been effected by drilling a hole through the center of the blade shank and inserting lead weights of various sizes to effect a balance. However, this method of inserting weights accomplishes only static balance. The hole drilled in the blade shank also weakens the shank at the natural plane of rupture. This method is also slow and inefficient from the manufacturing standpoint.

An object, therefore, of my invention is to provide, a single, adjustable means applied to each blade for ensuring static and dynamic balance.

Another object of my invention is to strengthen the propeller blade, particularly at the shank where it is jointed to the hub, which is the natural plane of rupture.

A still further object of my invention is to provide a propeller with static and dynamic balancing means which shall be easy of application and inexpensive to manufacture.

In the form of the invention described herein, both static and dynamic balance are obtained by means of a screw-threaded plug which is inserted in a hole in the shank end of the propeller blade along the axis of the blade. The hole which is drilled into the shank of the blade is of sufficient length to extend an appreciable distance beyond and inside of the natural plane of rupture to distribute stresses in the core of the material, thereby reinforcing and strengthening the shank more or less in proportion to the stress-carrying ability of the threaded plug.

In the drawing,

Figure 1 is a view, partly in section and partly in elevation of a propeller blade, ferrule and hub.

Figure 2 is a sectional view of a propeller shank, showing an embodiment of the invention, and Figures 3 and 4 are end and side-views, respectively, of a reinforcing plug.

Referring to the drawing, the numeral 1 indicates a hub provided with a threaded socket 2 for receiving the shank end 3 of a propeller blade 4. Although I have shown only one socket and one blade, it is understood that two or more sockets will be provided in the hub for receiving a like number of blades, as required.

The propeller blade is herein shown as made of a fibrous, non-metallic material, such as Micarta or wood, and the shank end 3 of the blade 4 is fastened to the hub socket 2 through the intermediary of a threaded metallic ferrule 5. The threads 6 on the exterior surface of the ferrule cooperate with the threaded socket 2, while the interior threads 7 receive the threaded shank portion of the blade.

My improved means for obtaining both static and dynamic balance in the blade comprises a threaded cylindrical plug 8 which is screwed into a cooperating threaded opening 9 provided in the shank end 3 of the propeller blade 4. The hole 9 is drilled along the longitudinal axis of the blade and extends into it beyond the juncture 10 of the blade and ferrule, for a purpose to be hereinafter described.

The plug 8 may be hollow, as indicated at 11, in order to decrease its weight in proportion to its strength and length. One end of the plug may be provided with a transverse slot 12 in order to receive a suitable tool for effecting longitudinal adjustment of the plug in the hole. The slots 12 may be enlarged by a suitable tool in order to cause the adjacent threads to firmly grip the threads in the opening 9 and thus firmly secure the stud against movement after it has been properly adjusted.

A propeller blade of the type described is most likely to break off at the juncture between the shank proper and the ferrule, indicated at 10. It is, therefore, desirable to strengthen the blade at this place. Accordingly, the plug 8 is made of sufficient length to extend across this juncture when it is in its adjusted and fixed position.

In applying the invention to the propeller blade, a plug having sufficient weight to ensure static balance of one blade against the other is inserted in the opening 9. To provide dynamic balance of one blade against the other, the propeller is rotated by means of suitable dynamic balancing apparatus, and the correct position for the plug is ascertained by moving it slightly in one direction or the other. The plug is then placed in the correct position and its slotted end is opened by a wedge, thereby holding the plug in place.

It will be seen that, by means of an adjustable plug, I have provided a simple and effective means of obtaining static and dynamic balance in a propeller. The propeller is also additionally reinforced, and the whole means is cheap to manufacture and may be easily used.

While I have shown a ferrule hub structure, it is obvious that this balancing and reinforcing means may be applied to a blade mounting of any form, and that those skilled in the art may make modifications and changes without departing from the spirit and scope of the appended claims.

I claim as my invention:

1. In a propeller blade having a shank portion adapted to be inserted into a hub socket, said shank portion having a threaded opening extending longitudinally thereof, and rigid adjustable means inserted into the longitudinal opening in the shank portion, whereby adjustment of the position of the center of gravity of the propeller blade may be effected, said adjustable means being of such length as to reinforce the shank portion at the region where the hub socket terminates.

2. In a propeller blade having a shank portion adapted to be inserted into a hub socket, said shank portion having a threaded opening extending longitudinally thereof, and a hollow plug member of rigid material adjustably secured within the opening in the shank portion whereby the propeller blade may be balanced against an opposing blade, said hollow plug member being extended through the shank portion beyond the outer end of the hub socket.

3. In a propeller blade having a shank portion adapted to be inserted into a hub socket provided with a longitudinal opening extending therethrough, a plug member of rigid material adjustably secured within the opening in the shank portion and extending beyond the outer end of the hub socket, and means whereby the plug member may be adjusted longitudinally and locked in the adjusted position against further movement when the propeller blade is used.

4. In a propeller blade having a shank portion adapted to be inserted into a hub socket provided with a longitudinal opening extending therethrough, a hollow plug member of rigid material adjustably secured within the longitudinal opening, said plug member being shorter in length than the length of said opening but of sufficient length to extend beyond the outer end the hub socket, and means forming a portion of the plug member whereby it may be adjusted and locked in the adjusted position.

5. In a propeller blade having a shank portion adapted to be inserted into a hub socket, said shank portion being provided with a threaded longitudinal opening, a plug member of rigid material inserted within the opening and adjustably secured therein by means of threads engaging the threads in the opening, said plug member being adapted to reinforce the shank portion of the propeller blade at the outer end of the hub socket, and means whereby the plug may be locked in an adjusted position.

6. In a propeller blade having a shank portion adapted to be inserted into a hub socket, said shank portion being provided with a threaded longitudinal opening, a hollow plug member of rigid material inserted into the opening and provided with external threads for engaging the threads on the inside of the opening, said plug member being shorter in length than the length of the opening but of sufficient length to extend beyond the hub socket and adapted to reinforce the shank portion of the propeller blade at the outer end of the hub socket, and means on one end of the hollow plug member whereby it may be adjusted longitudinally to balance of the propeller blade and locked in the adjusted position.

7. In combination, a hub member provided with a socket portion for receiving a propeller blade, a propeller blade provided with a shank portion for securing it to the hub member, said shank portion being provided with a longitudinal opening extending beyond the outer end of the socket portion of the hub member, and rigid reinforcing means adjustably secured within the longitudinal opening of the shank portion, whereby adjustment of the position of the center of gravity of the blade may be obtained, said means being of sufficient length to extend beyond the outer end of the socket portion of the hub member.

8. In combination, a hub member provided with a socket portion for receiving a propeller blade, a propeller blade provided with a shank portion for securing the blade to the hub member, said shank portion being provided with a threaded longitudinal opening extending a distance beyond the open end of the hub socket, and a plug member of rigid material inserted within the opening, said plug member being of sufficient length to extend beyond the open end of the hub socket to reinforce the shank portion and having a threaded surface for engaging the threads in the opening and being of shorter length than the length of the opening, and means on the plug member whereby it may be adjusted longitudinally to adjust the position of the center of gravity of the propeller blade and locked in position against rotation.

9. In combination, a hub member provided with a socket for receiving a propeller blade, a propeller blade provided with a shank portion for securing the blade to the hub member, said shank portion being provided with a longitudinal opening extending beyond the open end of the hub socket, and a plug member of rigid material adjustably disposed within the longitudinal opening, said plug member extending beyond the open end of the hub socket, thereby to provide for reinforcing the shank portion of the blade where it enters the hub socket and for adjusting the balance of the blade.

10. In combination, a propeller blade having a shank portion, a hub member provided with a socket for receiving the shank portion of the blade, said shank portion of the blade having a longitudinal opening extending therethrough for a distance beyond the open end of the socket, and a rigid metallic plug member adjustably disposed in said opening of such length as to extend beyond the open end of the hub socket, whereby the shank portion of the blade is reinforced at the plane where the hub socket terminates and the blade balanced by adjusting the plug member longitudinally.

EDWIN E. ARNOLD.